(12) United States Patent
Huang et al.

(10) Patent No.: US 8,406,272 B2
(45) Date of Patent: Mar. 26, 2013

(54) FREQUENCY HOPPING METHOD FOR LOCALIZATION SYSTEM

(75) Inventors: Polly Huang, Taipei (TW); Tsung-Han Lin, Taipei (TW); I-Hei Wu, Yongkang (TW); Te-Yuan Huang, Taipei (TW); Seng-Yong Lau, Yonghe (TW)

(73) Assignee: National Taiwan University (TW)

( * ) Notice: Subject to any disclaimer, the term of this patent is extended or adjusted under 35 U.S.C. 154(b) by 716 days.

(21) Appl. No.: 12/608,025

(22) Filed: Oct. 29, 2009

(65) Prior Publication Data
US 2010/0303129 A1   Dec. 2, 2010

(30) Foreign Application Priority Data
Jun. 2, 2009   (TW) .............................. 98118230 A

(51) Int. Cl.
*H04B 1/715* (2011.01)
(52) U.S. Cl. ........................................... 375/132
(58) Field of Classification Search .... 455/456.1–456.6; 375/132–137
See application file for complete search history.

(56) References Cited

U.S. PATENT DOCUMENTS

| | | | |
|---|---|---|---|
| 6,167,276 A * | 12/2000 | Pite | 455/456.3 |
| 6,791,949 B1 * | 9/2004 | Ryu et al. | 370/254 |
| 2009/0086791 A1 * | 4/2009 | Bienas et al. | 375/132 |

* cited by examiner

*Primary Examiner* — Kevin Kim
(74) *Attorney, Agent, or Firm* — Schmeiser, Olsen & Watts, LLP

(57) ABSTRACT

A frequency hopping method for localization system is aimed to overcome the degradation of location accuracy due to radio interference if there are some other radio devices using the same radio frequency as a localization system. A Packet Reception Rate (PRR) thresholding or a learning-based approach for the diagnostic test is proposed. In that, a PRR thresholding or a set of parameters trained by Hidden Markov Model (HMM) is used as a criterion to decide whether or not to hop. The proposed hopping mechanism provides an accurate and stable localization with a minimum delay.

16 Claims, 6 Drawing Sheets

FREQUENCY HOPPING METHOD FOR LOCALIZATION SYSTEM

CROSS-REFERENCE TO RELATED APPLICATIONS

This non-provisional application claims priority under 35 U.S.C. §119(a) on Patent Application No(s). 098118230 filed in Taiwan, R.O.C. on 2 Jun. 2009, the entire contents of which are hereby incorporated by reference.

FIELD OF THE INVENTION

The present invention relates to a frequency hopping method provided for avoiding interferences of signals, in particular to a frequency hopping method for a localization system.

BACKGROUND OF THE INVENTION

As the Internet environment becomes popular, networks are developed from original cable networks to wireless networks. In recent years, wireless networks advance rapidly and wireless network services become increasingly popular, and wireless network applications start attracting people's attention, and one of the wireless network applications is a localization service.

The localization function provides useful information to mobile device users, and we can get related information of our neighborhood through the location information. For commercial applications, a transportation of goods can be managed more effectively and flexibly, and thus more and more companies adopt a localization system to improve their service and operation efficiency. At present, a global positioning system (GPS) is a common localization system, which provides convenient localization services as well as related applications of a mobile device. However, the present existing GPS not only comes with a high price, but also has technical difficulties of receiving satellite signals and using the GPS indoors or using it in a city with tall buildings all over the city. Unlike high power GPS localization systems, a low power indoor localization system starts blooming.

Short-distance wireless transmission technologies such as Bluetooth (IEEE 802.15.3), Wireless Fidelity (Wi-Fi, IEEE 802.11) and ZigBee (IEEE 802.15.4) used in a small area are developed and used for our living environment continuously.

A location-bound wireless localization system needs not to receive satellite signals above the Earth's surface, but uses a receiver located at a target to receive a signal transmitted by each beacon transmitter within a tracking area and its identification code (ID) to estimate the location of the target. A general location-bound wireless localization method such as radio frequency triangulation or radio frequency fingerprinting adopts a receive signal strength indicator (RSSI) as a basis for positioning a target.

The radio frequency triangulation uses the intensity of a received RSSI to estimate the distance between the receiver and the beacon transmitter and receives at least three signals transmitted from a beacon transmitter to perform localization of a target.

The radio frequency fingerprinting does not use the intensity of the RSSI for the estimation directly, but it compares a model created by the RSSI before positioning the target. Such comparison model must go through an actual site calibration to establish an individual model according to a RF characteristic value of each the beacon transmitter obtained in different environments, and the RSSI values at different indoor environments are received. Since the actual partition and construction material of buildings vary, and the scattering or attenuation so produced is different in each different environment, therefore it is necessary to input a planar map of the tracking area into a localization system, and physically move the receiver to every corner of the tracking area in order to save all RSSI values and establish a model of the environment before the localization system adopting the aforementioned method can be built. Actual positions established by the RSSI values and received by a receiver that is installed onto the target, the identification code of the beacon transmitter, and the model and map of the environment are used for performing an accurate localization.

From the description above, the location accuracy of the location-bound wireless localization system depends on the accuracy and the stability of the received RSSI values. Since these short-distance wireless transmission technologies are operated at a frequency of 2.40~2.49 GHz, the interference occurrence rate becomes increasingly higher as the frequency of using other wireless transmission devices in the same channel increases. Once if any interference occurs, the quality of transmitting signals via wireless transmissions drops significantly, and the RSSI values become distorted and unstable accordingly.

For the localization system, high efficiency and high accuracy are required, and thus we need a method to effectively overcome the problem of signal interference occurred during the localization process.

SUMMARY OF THE INVENTION

The primary objective of the present invention is to provide reliable location accuracy to a localization system.

Another objective of the present invention is to provide a method of overcoming the problem of a localization system being interfered by other signals by means of providing a frequency hopping method for the localization system, such that once if there is an interference, a hopping will be performed to enter into a quiet channel in order to avoid a busy channel.

A further objective of the present invention is to provide a criterion for determining whether or not a localization system should perform a frequency hopping, and to set a packet reception rate (PRR) threshold or use a hidden Markov model (HMM) with time dependence and self-learning capability to complete creating the aforementioned frequency hopping mechanism, and all of the above use the PRR as a basis to achieve the hopping effect.

To achieve the foregoing objectives, the frequency hopping method for a localization system in accordance with the present invention comprises the steps of: (A) monitoring a beacon transmitter in the localization system within a tracking area; (B) going to Step (C) if the beacon transmitter is interfered by a signal; and (C) performing a frequency hopping to enter all beacon transmitters of the localization system into a stable frequency channel.

In a first preferred embodiment of the present invention, a PPR thresholding is set and used for establishing a criterion to determine whether or not to perform a frequency hopping. In Step (A) of the first preferred embodiment of the present invention, a PRR of the beacon transmitter is monitored, and if the PRR of the beacon transmitter is below a threshold, the localization system will start performing a frequency hopping, wherein the threshold can be 35%-55%, and preferably 48%.

In Step (C) of the first preferred embodiment of the present invention, the beacon transmitter broadcasts a hopping request signal, such that all beacon transmitters in the localization system perform a frequency hopping to enter into the stable frequency channel, and the procedure returns to Step (A) to continue monitoring the beacon transmitter.

In Step (A) of the first preferred embodiment of the present invention, the PRR of the beacon transmitter will be monitored, only if the beacon transmitter can receive a signal transmitted from a second beacon transmitter.

In a second preferred embodiment of the present invention, a hidden Markov model (HMM) with a self-learning capability is provided for completing the criteria of determining a frequency hopping of a location-bound localization system by its simple procedure. Regardless of any environment, the localization system can conduct a self-learning and determine an interference situation accurately to perform a frequency hopping, such that the localization system can achieve stable and accurate localization of a target.

In Step (A) of a second preferred embodiment of the present invention comprises the steps of: (A1): An initialization stage is entered, and the PRR of the beacon transmitter is intercepted in the tracking area and used for training a HMM to obtain a set of parameters of the HMM and define a hopping observation range and a non-hopping observation range; and (A2): A diagnostic test stage is entered, and the current PRR of the beacon transmitter is intercepted, and the trained parameters of the HMM are used as a basis for estimating the HMM, so as to obtain a diagnostic test observation value. Step (B) further includes the steps of: (B1) entering into a hopping determination stage, and if the diagnostic test observation value falls within the hopping observation range, the procedure will go to Step (C); on the other hand, if the diagnostic test observation value falls within the non-hopping observation range, the procedure will return to Step (A2) to continue monitoring the beacon transmitter.

The Step (A1) of a second preferred embodiment of the present invention further comprises a step of (A0): entering into a linking-to-screening procedure, such that if the beacon transmitter can receive a signal transmitted from the second beacon transmitter, then the PRR of the beacon transmitter will be intercepted in the initialization stage.

In a second preferred embodiment of the present invention, the initialization stage comprises intercepting the PRR of the beacon transmitter at a time period which includes a duration of signal interference and no signal interference.

In the initialization stage of a second preferred embodiment of the present invention, the algorithm of training the HMM is an EM algorithm.

In the initialization stage of a second preferred embodiment of the present invention, the number of states of the hidden observation of the HMM is equal to 2, and the range of the hopping observation value indicates a greater hidden observation value, and the range of the non-hopping observation value indicates a smaller hidden observation value comparatively.

In the initialization stage of a second preferred embodiment of the present invention, the number of states of the hidden observation of the HMM is equal to 3, and the range of the hopping observation value indicates the smallest hidden observation value, and the range of the non-hopping observation values indicate the greatest hidden observation value and a value second to the greatest hidden observation value.

In a second preferred embodiment of the present invention, the diagnostic test observation value is a maximum output value obtained by estimating the HMM.

In the diagnostic test stage of a second preferred embodiment of the present invention, the algorithm of estimating the HMM is a forward algorithm.

In the diagnostic test stage of a second preferred embodiment of the present invention, the current PRR of the beacon transmitter is retrieved once every 140 to 250 milliseconds, preferably once every 200 milliseconds.

In the hopping determination stage of a second preferred embodiment of the present invention, a hopping request signal will be broadcasted if the beacon transmitter performs a frequency hopping, such that all beacon transmitters in the tracking area perform a frequency hopping to enter into the stable frequency channel, and then the procedure returns to Step (A2) to continue monitoring the beacon transmitter.

DESCRIPTION OF THE PREFERRED EMBODIMENTS

Other features and advantages of the present invention will become apparent in the following detailed description of the preferred embodiments with reference to the accompanying drawings.

Figure 1:
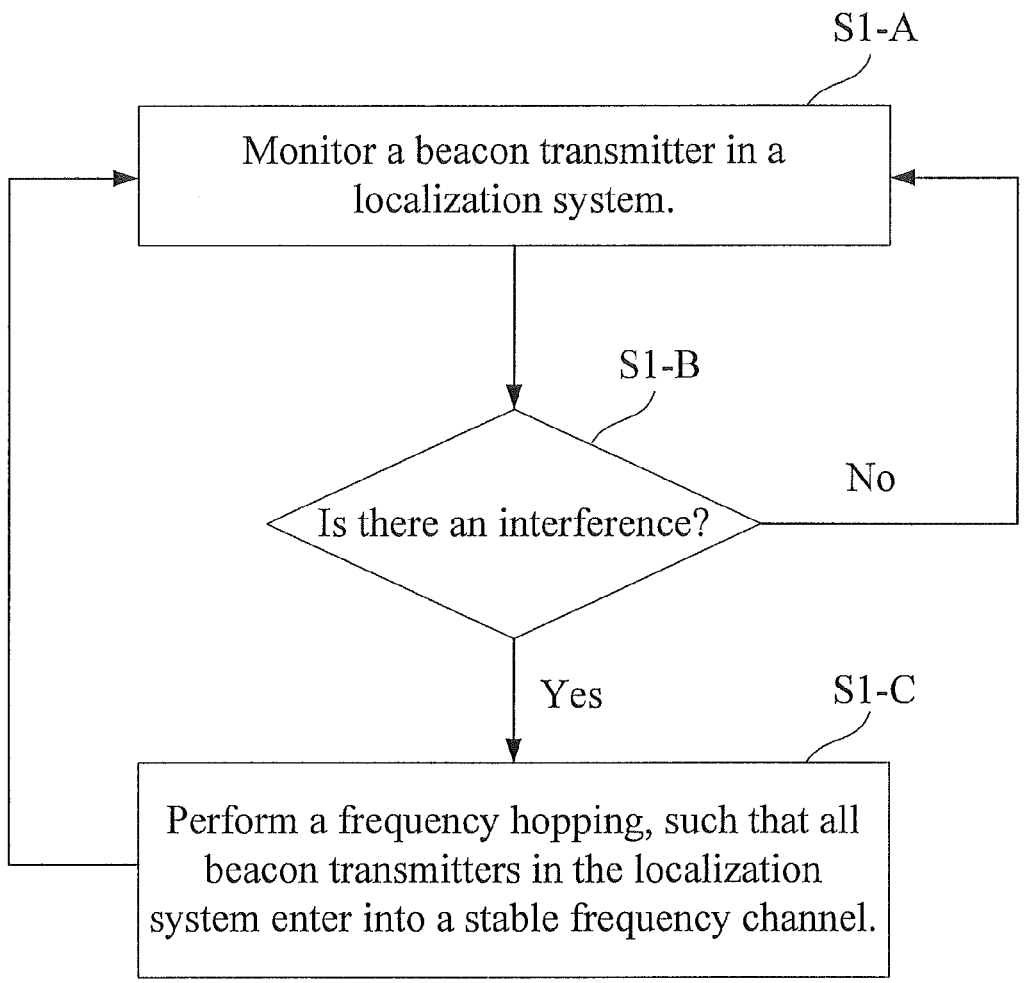
FIG. 1 is a flow chart of a frequency hopping method in accordance with the present invention.

With reference to FIG. 1 for a flow chart of a frequency hopping method provided by the present invention to overcome the shortcomings of the aforementioned conventional localization system and the low location accuracy, the frequency hopping method comprises the steps of:

(S1-A) monitoring a beacon transmitter in a localization system within a tracking area;

(S1-B) going to Step (S1-C) if the beacon transmitter is interfered by a signal; and on the other hand, returning to Step (S1-A) to continue monitoring the beacon transmitter if the beacon transmitter is not interfered by a signal, then the method; and (S1-C) performing a frequency hopping, such that all beacon transmitters in the localization system enter into a stable frequency channel, and returning to Step (S1-A) to continue monitoring the beacon transmitter.

With the establishment of the foregoing frequency hopping mechanism, the localization system can avoid interference to a frequency channel and maintain high location accuracy. The localization system of the present invention can use the PRR as a basis for the operation, wherein the PRR refers to a standardized result of a packet transmitted by a second beacon transmitter and received by a beacon transmitter within a tracking area in a specific time, which is a ratio of the number N1 of packets received by a first beacon transmitter of two beacon transmitters within a specific time to the number N2 of packets received by a second beacon transmitter of the two beacon transmitters in the same specific time, and such ratio is in terms of percentage which is (N1/N2)×100%. Wherein, the number N1 of packets are transmitted by the second beacon transmitter, and the number N2 of packets are transmitted by the first beacon transmitter.

Since each beacon transmitter within the tracking area is installed at a fixed position, therefore the intensity of signals received by adjacent beacon transmitters is constant. If there is any change such as the occurrence of interferences, then the PRR will be affected.

The present invention uses the concept of PRR as a criterion for determining whether or not to perform a frequency hopping. The determination criterion of the present invention is illustrated by two preferred embodiments as follows. In the first preferred embodiment, a threshold is set for the PRR, such that if the PRR is smaller than the threshold, a frequency hopping will be performed. In the second preferred embodiment, the HMM is used for implementing a self-learning determination criterion for selecting an appropriate time for the hopping automatically.

Figure 2:
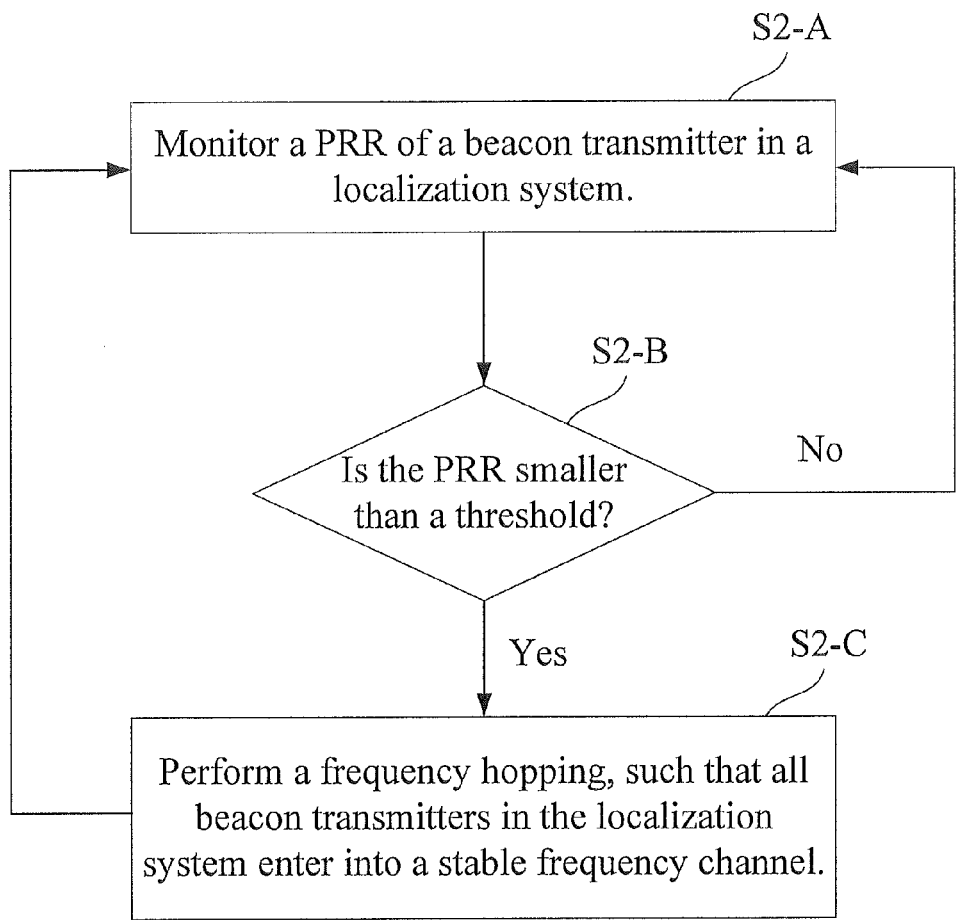
FIG. 2 is a flow chart of a frequency hopping method in accordance with a first preferred embodiment of the present invention.

With reference to FIG. 2 for a flow chart of a frequency hopping method in accordance with a first preferred embodiment of the present invention, the frequency hopping method comprises the steps of:

(S2-A) monitoring a PRR of a beacon transmitter in a localization system within a tracking area;

(S2-B) entering into Step (S2-C) if the PRR of the beacon transmitter is smaller than a threshold, or returning to Step (S2-A) to continue monitoring the beacon transmitter if the PRR is not smaller than the threshold; and (S2-C) performing a frequency hopping, such that all beacon transmitters in the localization system enter into a stable frequency channel, and returning to Step (S2-A) to continue monitoring the beacon transmitter.

In Step (S2-A), the PRR of the beacon transmitter will be monitored, only if the beacon transmitter can receive a signal transmitted from a second beacon transmitter. In other words, the beacon transmitter can receive at least one signal transmitted from another beacon transmitter such as the second beacon transmitter, and the link between the two beacon transmitters will be monitored. Thus, the frequency hopping method of the present invention monitors each link of the beacon transmitter individually.

In Step (S2-C), a hopping request signal will be broadcasted if the beacon transmitter is determined to perform a frequency hopping to avoid an interruption of a localization, and thus all beacon transmitters in the localization system perform a frequency hopping to enter into the stable frequency channel, and the procedure returns to Step (S2-A) to continue monitoring the beacon transmitter, wherein the frequency channel can be selected cyclically between 2.40 GHz and 2.49 GHz.

Since the PRR will drop if the interference of signals in the environment increases, therefore the threshold is set to define a minimum PRR for maintaining better location accuracy. If the threshold is set too low, then the interference at a certain portion will be neglected, so that a frequency hopping is not performed in an environment with a serious interference. On the other hand, if the threshold is set too high, then the frequency of hopping in the system will be too high, and packets may be lost, resulting in a location error. An ideal threshold is one taking the effect of a smaller PRR on a location estimation into consideration, and thus it is necessary to consider all PRRs before deciding the best PPR thresholding.

Figure 3:
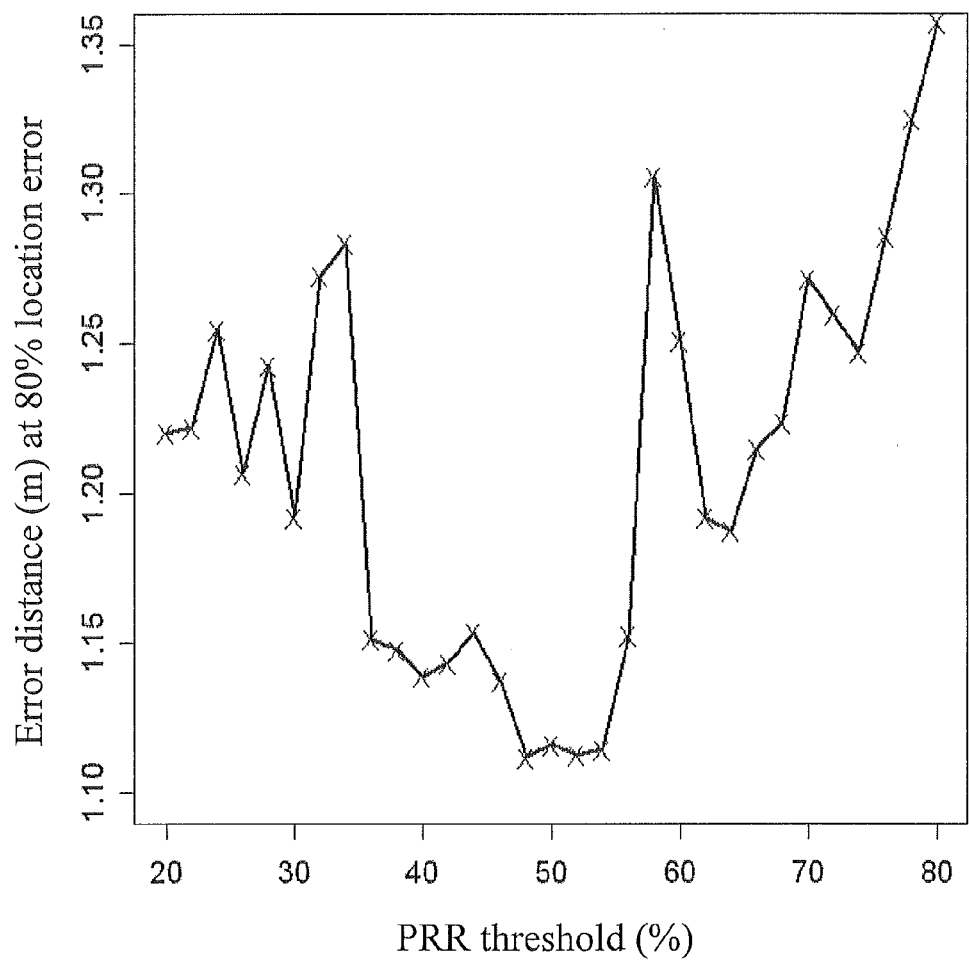
FIG. 3 is a coordinate graph of error distance measured with a location error occurrence rate of 80% versus PPR thresholding.

With reference to FIG. 3 for a coordinate graph of an error distance measured with a location error occurrence rate of 80% versus a PPR thresholding, the error distance is the smallest one when the threshold is set to 35%~55%, preferably 48%.

Figure 4:
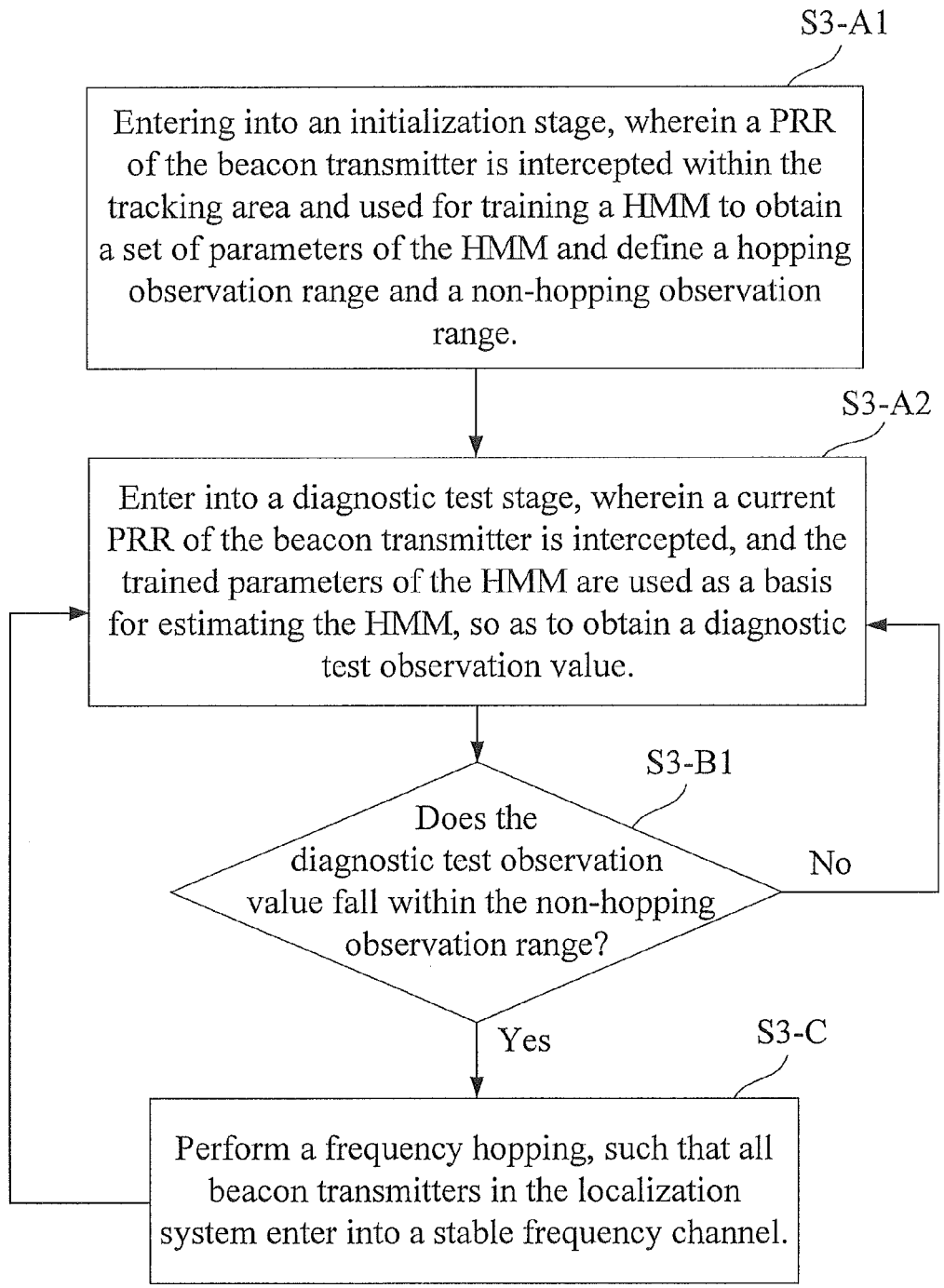
FIG. 4 is a flow chart of a frequency hopping method in accordance with a second preferred embodiment of the present invention.

With reference to FIG. 4 for a flow chart of a frequency hopping method in accordance with a second preferred embodiment of the present invention, the frequency hopping method comprises the steps of:

(S3-A1) entering into an initialization stage, wherein a PRR of the beacon transmitter is intercepted within the tracking area and used for training a HMM to obtain a set of parameters of the HMM and define a hopping observation range and a non-hopping observation range;

(S3-A2) entering into a diagnostic test stage, wherein a current PRR of the beacon transmitter is intercepted, and the trained parameters of the HMM are used as a basis for estimating the HMM, so as to obtain a diagnostic test observation value;

(S3-B1) entering into a hopping determination stage, wherein if the diagnostic test observation value falls within the hopping observation range, the beacon transmitter will enter into Step (S3-C); on the other hand, returning to Step (S3-A2) to continue monitoring the beacon transmitter if the diagnostic test observation value falls within the non-hopping observation range;

(S3-C) performing a frequency hopping, such that all beacon transmitters in the localization system enter into a stable frequency channel, and returning to Step (S3-A2) to continue monitoring the beacon transmitter.

Before Step (S3-A1) takes place, the method further comprises a Step (S3-A0): entering a linking-to-screening procedure, wherein the PRR of the beacon transmitter will be intercepted in the initialization stage, only if the beacon transmitter can receive a signal transmitted from a second beacon transmitter. In addition, a hopping request signal will be broadcasted if the beacon transmitter performs a frequency hopping, so that all beacon transmitters in the tracking area perform a frequency hopping to enter into the stable frequency channel, and the procedure returns to Step (S3-A2) to continue monitoring the beacon transmitter.

In summation, the frequency hopping method in accordance with a second preferred embodiment of the present invention includes three stages, respectively: a first stage which is the initialization stage, wherein a PRR of the beacon transmitter is intercepted within the tracking area and used for training a HMM to obtain a set of parameters of the HMM and define a hopping observation range and a non-hopping observation range; a second stage which is the diagnostic test stage, wherein a current PRR of the beacon transmitter is intercepted, and the trained parameters of the HMM are used as a basis for estimating the HMM, so as to obtain a diagnostic test observation value and continue detecting the level of interference produced by background noises; a third stage which is the hopping determination stage, wherein if the diagnostic test observation value falls within the hopping observation range, the beacon transmitter will perform a frequency hopping; on the other hand, if the diagnostic test observation value falls within the non-hopping observation range, the beacon transmitter will not perform a frequency hopping. The set of parameters of the HMM include the hidden observation value of each state. The tracking area refers to an area of a plurality of beacon transmitters installed at fixed positions. Since the terrain or other factors may affect the quality of transmitting signals, therefore not every beacon transmitter can receive the signals transmitted by all other beacon transmitters within the tracking area. Before the localization system in accordance with the second preferred embodiment is initialized, a linking-to-screening procedure is performed between beacon transmitters. If a beacon transmitter can receive a signal transmitted from another beacon transmitter, then the link between the two beacon transmitters will take place to enter into the aforementioned initialization stage. The frequency hopping method in accordance with a second preferred embodiment of the present invention monitors every link of each beacon transmitter. For instance, if two stable links are established between the beacon transmitter and two other beacon transmitters respectively (in other words, a signal is received), then the two links are monitored according to the aforementioned three stages. As long as there is a connection being interfered, a frequency hopping will be performed.

After the connection with the second beacon transmitter is confirmed to be valid, then the hopping system of the beacon transmitter starts performing the aforementioned three-stage procedure. Firstly, the PRR of the beacon transmitter is intercepted continuously in the initialization stage, and the PRRs are used as initialized observation values. Now, the initialized observation values form a Gaussian distribution which is a result of the characterized PRRs. The observation values are used for training the HMM to obtain a set of related parameters and define a hopping observation range and a non-hopping observation range according to the parameters. There are different training methods such as an Expectation-Maximization (EM) algorithm and a Viterbi algorithm, etc, and this preferred embodiment adopts the EM algorithm for training the parameters of the HMM.

HMM is a doubly stochastic process, wherein one is a state transition probability and another one is a state observation probability. Since the data transmission is time dependent, the transmission will continue within a second after a data transmission (or the PRR starts), and will end as long as the whole transmission completes. The data will not be transmitted partially at a time, and thus in the second preferred embodiment of the present invention, the state transition probability stands for a probability of converting between a hopping and a non-hopping in the next moment after the training takes place in the initialization stage, and the state observation probability stands for a probability of the occurrence of a hopping or a non-hopping. The HMM can be represented by the following mathematical symbols: $\lambda=(N, A, B, \pi)$, where:

N is the number of states in the HMM, such as $S_1 \ldots S_i \ldots S_N$;

$O_t$ is an observation value, which is a PRR represented by the Gaussian distribution, and $O_t \in \{N(\mu_i, \sigma_i^2)\}$, $\mu_i$ is the mean of PRRs at the state i, and $\sigma_i^2$ is the variance of the PRRs at the state i;

$\pi$ is the set of probabilities of all states, such as $\pi_i = P(q_1 = S_i)$ for the probability at an initial state (t=1) at state i, and $q_1 \in \{S_1, S_2, \ldots, S_N\}$, and $q_t$ stands for the estimated state at the time t;

A is $\{a_{ij}\}$, which is the set of all state transition probabilities, and $a_{ij}=P(q_t=S_j|q_{t-1}=S_i)$ stands for a porbability of a transition from state i to state j, and $0<(t-1)<t$;

B is $\{b_i(O_t)\}$, which is a probability distribution of the observation value $O_t$ at state i in time t, wherein:

$$b_i(O_t) = P(O_t \in \{N(\mu_i, \sigma_i^2)\}|q_t=S_i).$$

The numerical values of the aforementioned set of parameters can be obtained after going through a sufficient learning in the initialization stage. The learning may take place for a long time continuously in this stage, and the learning period in this preferred embodiment preferably includes a time period when a signal is interfered and a signal is not interfered. In the situation described above, the learning time is at least one hour. The parameters trained after a sufficient learning can be used as a basis to determine whether or not a signal is interfered by other signals. In other words, an observation value at each hidden state is used as a standard. For example, the hidden state with the smallest observation value in a two-state HMM can be used as a hopping state, and other hidden states of the observation value refer to non-hopping states, and the observation values are characterized by a Gaussian distribution to represent the hidden states.

Figure 5:
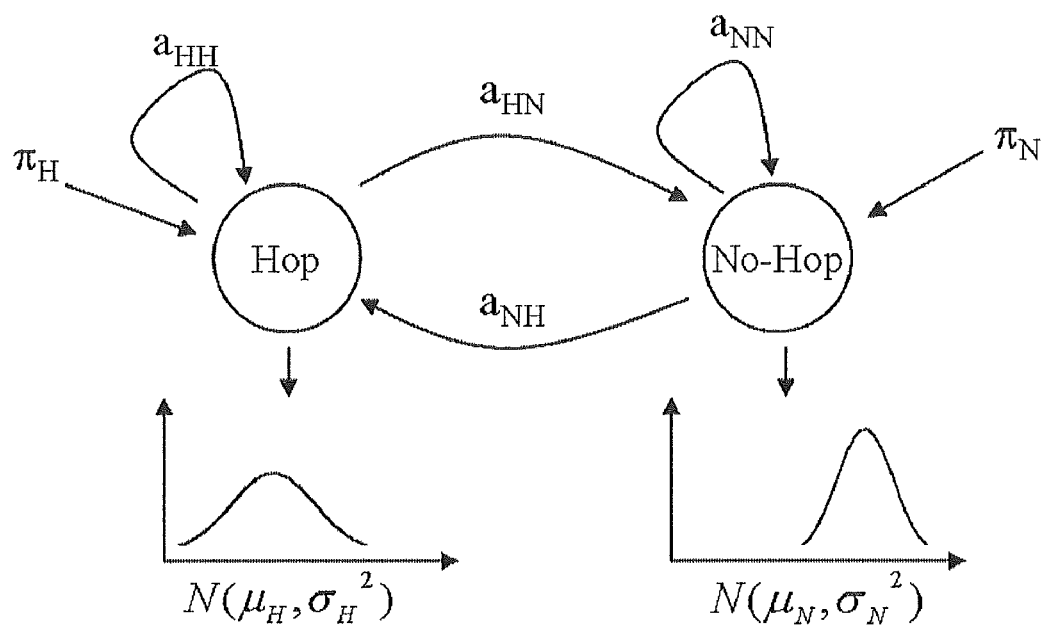
FIG. 5 is a schematic view of a two-state HMM in accordance with a second preferred embodiment of the present invention.

With reference to FIG. 5 for a schematic view of a two-state HMM in accordance with a second preferred embodiment of the present invention, there are two states of the HMM, indicating a hopping (H) state and a non-hopping (N) state. In FIG. 5, the following mathematical symbols are used:

$\pi_H$ is a probability of all occurrences of the hopping;

$\pi_N$ is a probability of all occurrences of the non-hopping;

$a_{HH}$ is a transition probability of a transition from a hopping state to a hopping state;

$a_{HN}$ is a transition probability of a transition from a hopping state to a non-hopping state;

$a_{NH}$ is a transition probability of a transition from a non-hopping state to a hopping state;

$a_{NN}$ is a transition probability of a transition from a non-hopping state to a non-hopping state;

$\mu_H$ is a mean of the PRRs at a hopping state;

$\mu_N$ is a mean of the PRRs at a non-hopping state;

$\sigma_H^2$ is a variance of the PRRs at a hopping state; and $\sigma_N^2$ is a variance of the PRRs at a non-hopping state.

The numerical values obtained by training the aforementioned parameters of each HMM in the initialization stage are provided for use after entering into the diagnostic test stage. In the diagnostic test stage, a current PRR of the beacon transmitter is intercepted, and the foregoing trained parameters of the HMM are used as a basis for estimating the HMM to obtain diagnostic test observation values. In a preferred embodiment of the present invention, the time interval for continuously intercepting the current PRRs of the beacon transmitter can be set to 140~250 milliseconds (ms), preferably 200 milliseconds (ms). In other words, the diagnostic test stage is gone through 50 times for every 10 seconds. In the hopping determination stage, if the diagnostic test observation value obtained by converting the intercepted PRR falls within the hopping observation range N ($\mu_H, \sigma_H$), the beacon transmitter will perform a hopping; on the other hand, if the diagnostic test observation value falls within the non-hopping observation range N ($\mu_H, \sigma_H$), the beacon transmitter will not perform a hopping. The trained hopping observation range and non-hopping observation range as shown at the bottom of FIG. 5 constitute a Gaussian distribution, and the subscript H stands for hopping, and the subscript N stands for non-hopping. The determination criterion of the second preferred embodiment of the present invention is obtained by training and self-learning in order to fit various different environments.

In the diagnostic test stage, a PRR is intercepted continuously by the beacon transmitter and converted into a characteristic value, and the obtained parameters (including N, $\pi$, A and B) are used for estimating of output values of the HMM, and the maximum of the output values is the diagnostic test observation value. In the method of estimating the output values in accordance with this preferred embodiment, a forward algorithm is used, and the algorithm is applied in a Matlab program for estimating a diagnostic test observation value qt at the time t. The PRR needs to be a characterized value expressed in a Gaussian distribution, and thus it is necessary to make a conversion by the following conversion function before using the forward algorithm:

$$b_i(O_t) = \frac{1}{\sqrt{2\pi}\,\sigma_i} e^{-(O_t-\mu_i)/(2\sigma_i^2)} \quad (1)$$

Wherein π in Equation (1) is the ratio of circumference of a circle, and other parameters are described below.

The program codes in the MATLAB for the estimation are given in Table 1, and these program codes are used for the illustration purpose only.

TABLE 1

Input: N, π, A, B, t, $O_t$, $\square_{t-1}$
Output: $\square_t$, $q_t$
If t = 1 then
  For each state i do
    $\alpha_t(i) = \pi_i \times b_i(O_t)$
  end
else
  for each state i do $$\alpha_t(i) = \left[\sum_{j=1}^{N} \alpha_{t-1}(j) \times a_{ji}\right] \times b_i(O_t)$$

end
end
$q_t = \arg\max_i \alpha_t(i)$

In diagnostic test stage, the diagnostic test observation value qt varied with the time is estimated continuously. In the hopping determination stage, if the estimated diagnostic test observation value falls within the Gaussian distribution of hopping, then the beacon transmitter will perform a frequency hopping signal, and the procedure will go to Step (S3-C), such that all beacon transmitters in the tracking area will hop together to enter into a next channel. On the other hand, if the estimated diagnostic test observation value falls within the Gaussian distribution of the non-hopping, then the beacon transmitter will not hop, and the procedure will return to Step (S3-A2) to continue the monitoring in the diagnostic test stage, wherein the frequency channel can be selected cyclically from 2.40 GHz to 2.49 GHz until a stable frequency channel is entered.

It is noteworthy to point out that the aforementioned EM algorithm, forward algorithm, and MATLAB program codes are provided for the illustration purpose only, and any algorithm capable of training the HMM and any program codes capable of estimating the numerical values can be used as an equivalence for the present invention.

In the second preferred embodiment, the HMM is a two-state HMM, but a three-state HMM can be used in another preferred embodiment for providing a more accurate learning model, such that an accurate location state including the non-hopping state can be achieved in the situation of a slight packet loss. Therefore, two non-hopping states and one hopping state are learned to obtain the states of three different Gaussian distributions, and each state has a hidden observation value which is also a Gaussian distribution. The range of the hopping observation value stands for the smallest hidden observation value, and the range of the non-hopping observation values stands for the largest hidden observation value and a hidden observation value second to the largest hidden observation value. A hopping will not be performed for a slight interference of signals which does not affect the location accuracy, so that the system can reduce the frequency of the hopping to improve the efficiency.

Figure 6:
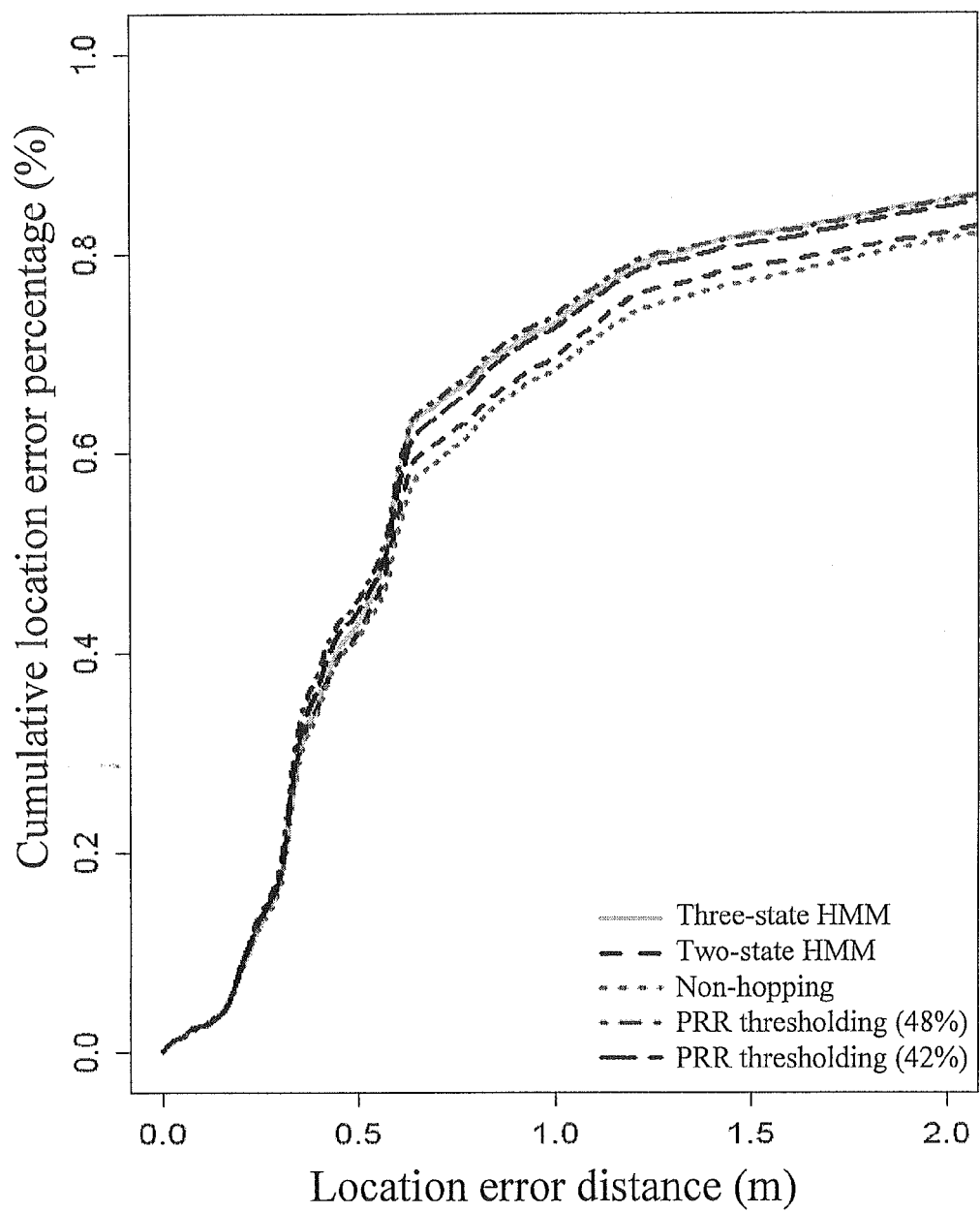
FIG. 6 is a coordinate graph of cumulative location error percentage of different hopping determination criteria versus location error distance, in a condition with signal interferences.

With reference to FIG. 6 for a coordinate graph of cumulative location error percentage of different hopping determination criteria versus location error distance in the situation of having signal interferences, the determination criteria include: a three-state HMM, a two-state HMM, a PPR thresholding (48%), a PPR thresholding (42%) and a non-hopping mechanism.

In FIG. 6, if there is a probability of 80% of having a location error, the location errors arranged in a descending order are non-hopping, two-state HMM, PPR thresholding (42%), three-state HMM, and PPR thresholding (48%) respectively. Compared with a system without having a frequency hopping mechanism, the three-state HMM can improve the location error of the system from 1.8 meters to 1.3 meters and improves 28% of the location accuracy. In addition, the location error of the three-state HMM is equal to the location error of the PPR thresholding (48%). The location error of the two-state HMM is equal to the location error of the PPR thresholding (42%).

Therefore, the hopping method used in a localization system in accordance with the present invention can overcome the drawback of the prior art having a low location accuracy when there is an interference, and the PRR detection mechanism can achieve the effect of selecting a hopping at an appropriate time, and the self-learning hopping mechanism can be used extensively in various different environments. Obviously, the present invention provides stable location accuracy to the localization system, and the location accuracy will not drop suddenly due to the interference of other signals.

While the invention has been described by means of specific embodiments, numerous modifications and variations could be made thereto by those skilled in the art without departing from the scope and spirit of the invention set forth in the claims.

What is claimed is:

1. A frequency hopping method for a localization system, comprising the steps of:
    (A) monitoring a packet reception rate of a beacon transmitter in the localization system within a tracking area, wherein the packet reception rate of the beacon transmitter is monitored only if the beacon transmitter receives a signal transmitted by a second beacon transmitter;
    (B) going to Step (C) if the packet reception rate of the beacon transmitter is below a threshold value; and
    (C) performing a frequency hopping to enter all beacon transmitters in the localization system into a stable frequency channel.

2. The frequency hopping method of claim 1, wherein if the packet reception rate of the beacon transmitter is not less than the threshold value in Step (B), then the frequency hopping method returns to Step (A) to continue monitoring the beacon transmitter.

3. The frequency hopping method of claim 1, wherein the threshold value is 35% to 55%.

4. The frequency hopping method of claim 1, wherein the threshold value is 48%.

5. The frequency hopping method of claim 1, wherein the beacon transmitter broadcasts a hopping request signal in Step (C), such that all beacon transmitters in the localization system perform a frequency hopping to enter into the stable frequency channel, and the frequency hopping method returns to Step (A) to continue monitoring the beacon transmitter.

6. A frequency hopping method for a localization system, comprising the steps of:
- (A) monitoring a packet reception rate of a beacon transmitter in the localization system within a tracking area
- (B) going to Step (C) if the beacon transmitter is interfered by a signal; and
- (C) performing a frequency hopping to enter all beacon transmitters in the localization system into a stable frequency channel;

wherein step (A) comprises the steps of:
- (A0) entering into a link screening process, wherein the packet reception rate of the beacon transmitter is intercepted only if the beacon transmitter receives a signal transmitted by a second beacon transmitter;
- (A1) entering into an initialization stage, wherein the packet reception rate of the beacon transmitter is intercepted within the tracking area and used for training a HMM to obtain a set of parameters of the HMM and define a hopping observation range and a non-hopping observation range;
- (A2) entering into a diagnostic test stage, wherein a current packet reception rate of the beacon transmitter is intercepted, and the trained parameters of the HMM are used as a basis for estimating the HMM, so as to obtain a diagnostic test observation value; and Step (B) comprises the steps of:
- (B1) entering into a hopping determination stage, wherein if the diagnostic test observation value falls within the hopping observation range, the beacon transmitter will enter into Step (C).

7. The frequency hopping method of claim 6, wherein if the diagnostic test observation value falls within the non-hopping observation range in Step (B1), the frequency hopping method will return to Step (A2) to continue monitoring the beacon transmitter.

8. The frequency hopping method of claim 6, wherein the initialization stage intercepts the PRR of the beacon transmitter at a time period which includes the duration of signal interference and no signal interference.

9. The frequency hopping method of claim 6, wherein the algorithm of training the HMM in the initialization stage is an EM algorithm.

10. The frequency hopping method of claim 6, wherein the number of states of the hidden observation of the HMM in the initialization stage is equal to 2, and the range of hopping observation value indicates a greater hidden observation value, and the range of non-hopping observation value indicates a smaller hidden observation value comparatively.

11. The frequency hopping method of claim 6, wherein the number of states of the hidden observation of the HMM in the initialization stage is equal to 3, the range of hopping observation value indicates the smallest hidden observation value, and the range of non-hopping observation values indicates the greatest and middle hidden observation values.

12. The frequency hopping method of claim 6, wherein the diagnostic test observation value in the diagnostic test stage is a maximum output value obtained by estimating the HMM.

13. The frequency hopping method of claim 6, wherein the algorithm of estimating the HMM in the diagnostic test stage is a forward algorithm.

14. The frequency hopping method of claim 6, wherein the packet reception rate of the current beacon transmitter is retrieved once every 140 to 250 milliseconds in the diagnostic test stage.

15. The frequency hopping method of claim 6, wherein the packet reception rate of the current beacon transmitter is retrieved once every 200 milliseconds in the diagnostic test stage.

16. The frequency hopping method of claim 6, wherein if the beacon transmitter performs a frequency hopping in the hopping determination stage, a hopping request signal will be broadcasted, such that all beacon transmitters within the tracking area perform a frequency hopping to enter into the stable frequency channel, and the frequency hopping method returns to Step (A2) to continue monitoring the beacon transmitter.

* * * * *